(12) United States Patent
Stadler et al.

(10) Patent No.: US 7,158,273 B2
(45) Date of Patent: *Jan. 2, 2007

(54) HOLOGRAPHIC DATA MEMORY

(75) Inventors: Stefan Stadler, Hamburg (DE);
Matthias Gerspach, Dossenheim (DE);
Christoph Dietrich, Heidelberg (DE);
Jörn Leiber, Hamburg (DE); Steffen Noehte, Weinheim (DE)

(73) Assignee: Tesa Scribos GmbH, Heidelberg (DE)

( * ) Notice: Subject to any disclaimer, the term of this patent is extended or adjusted under 35 U.S.C. 154(b) by 2 days.

This patent is subject to a terminal disclaimer.

(21) Appl. No.: 10/343,928

(22) PCT Filed: May 23, 2001

(86) PCT No.: PCT/EP01/05933

§ 371 (c)(1),
(2), (4) Date: Mar. 7, 2003

(87) PCT Pub. No.: WO02/15180

PCT Pub. Date: Feb. 21, 2002

(65) Prior Publication Data

US 2003/0161018 A1 Aug. 28, 2003

(30) Foreign Application Priority Data

Aug. 11, 2000 (DE) .................................. 100 39 370

(51) Int. Cl.
*G03H 1/02* (2006.01)
(52) U.S. Cl. ...................... 359/3; 359/2; 430/1; 283/86; 365/216; 365/234; 369/103

(58) Field of Classification Search .................... 359/2, 359/3, 35; 430/1, 2; 365/125, 216, 234; 283/85, 86; 369/103
See application file for complete search history.

(56) References Cited

U.S. PATENT DOCUMENTS

| 3,288,389 A | 11/1966 | Gersch et al. |
| 3,823,276 A | 7/1974 | Maslowski et al. ...... 179/100.3 |
| 3,976,354 A | 8/1976 | Braitberg et al. |
| 4,069,049 A | 1/1978 | Reich et al. |
| 4,085,501 A | 4/1978 | Currie .......................... 29/593 |
| 4,252,400 A | 2/1981 | Bernal et al. .............. 350/3.63 |
| 4,320,489 A | 3/1982 | Crandall et al. ............ 369/111 |
| 4,548,889 A | 10/1985 | Nemoto et al. ............. 430/273 |

(Continued)

FOREIGN PATENT DOCUMENTS

DE 23 12 328 10/1974

(Continued)

OTHER PUBLICATIONS

Ramanujam et al., "Instant Holography" Appl. Phys.Lett., vol. 74 (21) pp. 3227-3229 (May 1999).

(Continued)

*Primary Examiner*—Leonidas Boutsikaris
(74) *Attorney, Agent, or Firm*—Nixon & Vanderhye, PC

(57) ABSTRACT

A holographic data storage medium has a polymer film which is set up as a storage layer whose refractive index can be changed locally by heating. The polymer film is set up for the storage of optical phase information via the local optical path length of the polymer film, which is illuminated in transmission when the information is read out. To the polymer film, there can be assigned an absorber dye, in order to at least partly absorb a write beam to input information and to give up the heat produced in the process at least partly locally to the polymer film. Preferably, a reflective layer is arranged behind the polymer film.

32 Claims, 1 Drawing Sheet

U.S. PATENT DOCUMENTS

| | | | |
|---|---|---|---|
| 4,581,317 A | 4/1986 | Simmons, III | 430/270 |
| 4,599,718 A | 7/1986 | Nakagawa et al. | 369/100 |
| 4,638,335 A | 1/1987 | Smith et al. | |
| 4,651,172 A | 3/1987 | Watanabe et al. | 346/135.1 |
| 4,773,060 A | 9/1988 | Shimada et al. | 369/100 |
| 4,800,112 A | 1/1989 | Kano et al. | 428/163 |
| 4,837,745 A | 6/1989 | Eich et al. | 365/108 |
| 4,860,273 A | 8/1989 | Sawano et al. | 369/100 |
| 4,883,741 A | 11/1989 | Takahashi et al. | 430/270 |
| 4,918,682 A * | 4/1990 | Finegan | 369/275.2 |
| 4,933,221 A | 6/1990 | Nishimura et al. | |
| 4,970,707 A | 11/1990 | Hara et al. | 369/44.11 |
| 5,014,259 A | 5/1991 | Goldberg et al. | 369/284 |
| 5,019,476 A | 5/1991 | Kanno et al. | 430/20 |
| 5,023,859 A | 6/1991 | Eich et al. | 365/113 |
| 5,034,943 A | 7/1991 | Antonov et al. | 369/260 |
| 5,049,462 A | 9/1991 | Funhoff et al. | 430/21 |
| 5,063,555 A | 11/1991 | Miyoshi et al. | 369/97 |
| 5,077,724 A | 12/1991 | Gregg | |
| 5,090,008 A | 2/1992 | Clark et al. | 369/284 |
| 5,090,009 A | 2/1992 | Hamada et al. | |
| 5,098,803 A * | 3/1992 | Monroe et al. | 430/1 |
| 5,098,975 A | 3/1992 | Omelis et al. | |
| 5,109,374 A | 4/1992 | Tsunoda et al. | 369/100 |
| 5,124,183 A | 6/1992 | Nakano et al. | 428/1 |
| 5,188,863 A | 2/1993 | De Graaf et al. | 427/512 |
| 5,205,178 A | 4/1993 | Odernheimer | 73/863.12 |
| 5,215,800 A | 6/1993 | Daido et al. | 428/64 |
| 5,234,799 A | 8/1993 | Nagae et al. | 430/345 |
| 5,272,689 A | 12/1993 | Tsujioka et al. | 369/112 |
| 5,289,407 A | 2/1994 | Strickler et al. | 365/106 |
| 5,297,132 A | 3/1994 | Takano et al. | 369/284 |
| 5,311,499 A | 5/1994 | Hwang | 369/275.2 |
| 5,312,713 A | 5/1994 | Yokoyama et al. | 430/200 |
| 5,368,789 A | 11/1994 | Kamitakahara et al. | 264/1.33 |
| 5,369,631 A | 11/1994 | Hwang | 369/113 |
| 5,382,463 A | 1/1995 | Adkins et al. | 428/141 |
| 5,447,767 A | 9/1995 | Tanabe et al. | 428/64.4 |
| 5,459,019 A | 10/1995 | Kato et al. | 430/271 |
| 5,508,143 A | 4/1996 | Taniguchi et al. | 430/270.21 |
| 5,509,991 A | 4/1996 | Choi | 156/245 |
| 5,510,171 A | 4/1996 | Faykish | |
| 5,519,517 A | 5/1996 | Redfield et al. | 359/22 |
| 5,572,492 A | 11/1996 | Ogawa | 369/14 |
| 5,587,993 A | 12/1996 | Gregg | 369/291 |
| 5,627,817 A | 5/1997 | Rosen et al. | 369/58 |
| 5,639,588 A | 6/1997 | Huh | 430/270.15 |
| 5,658,411 A | 8/1997 | Faykish | |
| 5,669,995 A | 9/1997 | Hong | 156/74 |
| 5,744,219 A | 4/1998 | Tahara | 428/195 |
| 5,764,583 A | 6/1998 | Cliff et al. | 365/230.03 |
| 5,797,492 A | 8/1998 | Seki et al. | |
| 5,800,950 A | 9/1998 | Hirao et al. | 430/1 |
| 5,838,653 A | 11/1998 | Fan et al. | 369/275.1 |
| 5,843,626 A | 12/1998 | Ohta et al. | |
| 5,851,615 A | 12/1998 | Kay | |
| 5,855,979 A | 1/1999 | Umehara et al. | 428/64.1 |
| 5,866,236 A | 2/1999 | Faykish et al. | |
| 5,871,881 A | 2/1999 | Nishida et al. | 430/270.11 |
| 5,879,774 A | 3/1999 | Taylor et al. | 428/64.1 |
| 5,890,674 A | 4/1999 | Major | |
| 5,958,650 A | 9/1999 | Wolleb et al. | |
| 5,998,007 A | 12/1999 | Prutkin et al. | 428/320.2 |
| 6,016,210 A | 1/2000 | Stappaerts | 359/10 |
| 6,016,984 A | 1/2000 | Trafton et al. | 242/348.1 |
| 6,168,682 B1 | 1/2001 | Bennett et al. | 156/295 |
| 6,236,589 B1 | 5/2001 | Gupta et al. | 365/151 |
| 6,266,166 B1 | 7/2001 | Katsumata et al. | |
| 6,310,850 B1 * | 10/2001 | Sochava et al. | 369/103 |
| 6,338,935 B1 | 1/2002 | Alperovich et al. | 430/270.11 |
| 6,364,233 B1 | 4/2002 | Crowley | 242/332.8 |
| 6,372,341 B1 | 4/2002 | Jung et al. | |
| 6,383,690 B1 | 5/2002 | Vargas | 430/5 |
| 6,386,458 B1 | 5/2002 | Leiber et al. | |
| 6,436,483 B1 | 8/2002 | Palmasi et al. | |
| 6,450,642 B1 | 9/2002 | Jethmalani et al. | 351/219 |
| 6,452,890 B1 | 9/2002 | Kawano et al. | 369/110.01 |
| 6,714,437 B1 | 3/2004 | Leiber et al. | |
| 6,723,259 B1 | 4/2004 | Groth et al. | 264/1.34 |
| 6,789,262 B1 | 9/2004 | Leiber et al. | 720/746 |
| 6,881,476 B1 | 4/2005 | Noehte et al. | 428/332 |
| 6,958,836 B1 | 10/2005 | Leiber et al. | 359/1 |
| 2003/0096105 A1 | 5/2003 | Noehte et al. | |
| 2003/0142619 A1 | 7/2003 | Mussig et al. | |
| 2003/0156524 A1 | 8/2003 | Stadler et al. | |
| 2003/0161018 A1 | 8/2003 | Stadler et al. | |
| 2003/0165105 A1 | 9/2003 | Leiber et al. | |
| 2003/0165746 A1 | 9/2003 | Stadler et al. | |
| 2003/0169674 A1 | 9/2003 | Leiber et al. | |
| 2003/0179277 A1 | 9/2003 | Stadler et al. | |
| 2003/0235136 A1 * | 12/2003 | Akselrod et al. | 369/108 |
| 2004/0009406 A1 | 1/2004 | Hesselink et al. | |
| 2004/0030732 A1 | 2/2004 | Gerspach et al. | |
| 2004/0036187 A1 | 2/2004 | Leiber et al. | |
| 2004/0051919 A1 | 3/2004 | Noehte et al. | |
| 2004/0053140 A1 * | 3/2004 | Stadler et al. | 430/1 |
| 2004/0066546 A1 | 4/2004 | Noehte et al. | |
| 2004/0136037 A1 | 7/2004 | Leiber et al. | |
| 2004/0136040 A1 | 7/2004 | Noehte et al. | |
| 2004/0145788 A1 | 7/2004 | Leiber et al. | |

FOREIGN PATENT DOCUMENTS

| | | |
|---|---|---|
| DE | 37 23 522 | 2/1989 |
| DE | 3810722 A1 | 10/1989 |
| DE | 3920420 A1 | 1/1991 |
| DE | 195 37 829 C2 | 10/1996 |
| DE | 692 22 527 | 4/1998 |
| DE | 69222527 | 4/1998 |
| DE | 198 08 288 A1 | 9/1999 |
| DE | 101 28 902 A1 | 10/2003 |
| EP | 0 323 167 | 7/1989 |
| EP | 0 352 194 | 1/1990 |
| EP | 0 360 144 | 3/1990 |
| EP | 0 384 041 | 8/1990 |
| EP | 0 403 971 | 12/1990 |
| EP | 0 421 761 | 4/1991 |
| EP | 0 458 604 | 11/1991 |
| EP | 0 938 255 | 11/1991 |
| EP | 0 475 336 | 3/1992 |
| EP | 0 514 589 | 11/1992 |
| EP | 0 519 633 | 12/1992 |
| EP | 0 528 134 | 2/1993 |
| EP | 0 552 887 | 7/1993 |
| EP | 0 585 076 | 3/1994 |
| EP | 0 613 126 | 8/1994 |
| EP | 0 615 233 A1 | 9/1994 |
| EP | 0 660 262 A2 | 6/1995 |
| EP | 0 750 308 | 12/1996 |
| EP | 0 768 353 | 4/1997 |
| FR | 2 703 815 | 10/1994 |
| GB | 2 211 760 A | 7/1989 |
| JP | 55-080832 | 6/1980 |
| JP | 58-155543 * | 9/1983 |
| JP | 60-52941 | 3/1985 |
| JP | 61-99981 | 5/1986 |
| JP | 61-145746 | 7/1986 |
| JP | 62-231437 | 10/1987 |
| JP | 63-039381 | 2/1988 |
| JP | 63-304429 | 12/1988 |
| JP | 1-190494 | 7/1989 |
| JP | 1-256042 | 10/1989 |

| | | |
|---|---|---|
| JP | 2-105346 | 4/1990 |
| JP | 2-118632 | 5/1990 |
| JP | 3-134852 | 6/1991 |
| JP | 3-147540 | 6/1991 |
| JP | 3-164293 | 7/1991 |
| JP | 4-197781 | 7/1992 |
| JP | 5-046061 | 2/1993 |
| JP | 5-109234 | 4/1993 |
| JP | 5109121 | 4/1993 |
| JP | 5-334749 | 12/1993 |
| JP | 6-20292 | 1/1994 |
| JP | 8-273325 | 10/1996 |
| JP | 9-171235 | 6/1997 |
| WO | 00/09884 | 2/2000 |
| WO | WO 00/17864 | 3/2000 |
| WO | WO 00 17864 | 3/2000 |
| WO | 00/54112 | 9/2000 |
| WO | WO 01/04880 A1 | 1/2001 |
| WO | WO 01/84544 A | 11/2001 |
| WO | 02/15179 | 2/2002 |
| WO | WO 02/46845 A1 | 6/2002 |

OTHER PUBLICATIONS

U.S. Appl. No. 10/480,817 with a copy of pending claims as of Aug. 15, 2006.
U.S. Appl. No. 10/472,970 with a copy of pending claims as of Aug. 15, 2006.
U.S. Appl. No. 10/344,152 with a copy of pending claims as of Aug. 15, 2006.
U.S. Appl. No. 10/433,573 with a copy of pending claims as of Aug. 15, 2006.
U.S. Appl. No. 10/343,981 with a copy of pending claims as of Aug. 15, 2006.
U.S. Appl. No. 10/312,466 with a copy of pending claims as of Aug. 15, 2006.
CHIP Das Computer Magazine, Industrie Baut Auf Plastik, Tesa-Film als Giga-Speicher, pp. 194-198 (1998).
Optimem Das Projekt OptiMem verfolgt im Wesentlichen drei Ziele: pp. 1-8 Inhaltsverzeichnis CHIP Sep. 1998 Nov. 1999 Pich Klebe für mehr Gigabyte.

* cited by examiner

HOLOGRAPHIC DATA MEMORY

This application is the national stage of PCT/EP01/05933, filed May 23, 2001, which designated the United States.

BACKGROUND AND SUMMARY

The present technology relates to a holographic data storage medium which can be used, for example, for storing image data such as photos, logos, text, and for the storage of other data.

In a hologram, optical phase information about an object is contained distributed over the surface of the hologram, from which an image of the object can be reconstructed when it is irradiated with light, in particular coherent light from a laser. Holograms are used in industry in many ways, for example in the form of largely counterfeit-proof identifications. Identifications of this type will be found, for example, on credit cards or cheque cards; as what are known as white light holograms, they show a three-dimensional image of the object represented even when lit with natural light. Photographically produced holograms and embossed holograms are widespread, in which a relief structure is embossed into the surface of a material, at which the light used to reproduce the object is scattered in accordance with the phase information stored in the hologram, so that the reconstructed image of the object is produced by interference effects.

WO 00/17864 describes a data storage medium having an optical information carrier which contains a polymer film set up as a storage layer. The polymer film consists, for example, of biaxially oriented polypropylene. In the previously disclosed data storage medium, the polymer film is wound spirally in a plurality of layers onto a core, there being an adhesive layer in each case between adjacent layers. Information can be written into the data storage medium by the polymer film being heated locally with the aid of a write beam from a data drive, as a result of which the refractive index of the polymer film and the reflective capacity at the interface of the polymer film change locally. This can be registered with the aid of a read beam in the data drive, since the read beam is reflected locally more or less intently in the interface of the polymer film, depending on the information written in. By focusing the write beam or read beam, information can specifically be written into and read from a preselected layer of the information carrier.

The present technology provides a holographic data storage medium which is cost-effective and has wide possible applications.

This object is achieved by a holographic data storage medium having the features of Claim 1 and the use of a data storage medium according to Claim 11. A method of putting information into such a data storage medium is specified in Claim 13, a method of reading information from such a data storage medium in Claim 17. Advantageous refinements of the invention are listed in the dependent claims.

The holographic data storage medium according to the an exemplary embodiment of the invention has a polymer film set up as a storage layer, whose refractive index can be changed locally by heating. The polymer film is set up to store optical phase information by means of the local optical path length in the polymer film, which is illuminated in transmission when reading out information. In the polymer film, it is therefore possible to store phase information locally, that is to say in a region provided for the storage of a unit of information, by the refractive index being changed by heating in this region. The local change in the refractive index effects a change in the optical path length of the radiation used when reading information out of the polymer film (the radiation illuminating the polymer film in transmission). This is because the optical path length is the product of the geometric path length and the refractive index; by means of a change in the refractive index, therefore, the local phase angle of the radiation used when reading out information may be influenced, that is to say the desired phase information may be stored. The local region for storing a unit of information (referred to as a "pit" in the following text) typically has linear dimensions (that is to say, for example, a side length or a diameter) of the order of magnitude of 0.5 µm to 1 µm, but other sizes are also possible.

The holographic data storage medium according to an exemplary embodiment of the invention may therefore be used as a refractive phase hologram or transmission hologram. In this case, the desired phase information is stored locally via a change in the refractive index and, in order to read out information, the polymer film is transilluminated. As opposed to this, in the data storage medium disclosed by WO 00/17864, the reflective capacity at the interface of the polymer film is changed, in order to be able to register differences in the amplitude of a reflected read beam during the read operation. The holographic data storage medium according to an exemplary embodiment of the invention is cost-effective and can be applied in many ways, as emerges from the following text.

In the holographic data storage medium according to an exemplary embodiment of the invention, the polymer film is preferably biaxially oriented, for example by being pre-stressed in two mutually perpendicular directions within its plane during production. In an oriented polymer film, a high energy density is stored in the film material. As a result of heating by depositing a relatively low quantity of energy per unit area, for example with the aid of a write beam, a relatively high material change (for example densification of material) by reformation can be achieved, which results in a local change in the refractive index and therefore in a change in the optical path length in the polymer film. Biaxially oriented polymer films may be produced from mass-produced plastics, so that the holographic data storage medium is cost-effective.

Suitable materials for the polymer film are, for example, polypropylene, polyester or polyvinylchloride, polymer films which have such a material preferably being biaxially oriented. High temperature stability and therefore an improved resistance to ageing and storage stability of the holographic data storage medium, and an increased security against data loss arising from ageing processes may be achieved with polymer films which have an elevated crystallite melting point. In this case, the crystallite melting point is preferably at least 170° C. Examples of such materials are polyethylene naphthalate (PEN), polyethylene terephthalate (PET), polymethylpentene (PMP; also poly-2-methylpentene) and polyimide, a polymer film from such materials preferably also being biaxially oriented.

Preferred thicknesses of the polymer film lie in the range from 10 µm to 100 µm, preferably around or below 50 µm, but also smaller and greater thicknesses are conceivable.

In a preferred refinement of the invention, a reflective layer (for example of aluminium) is arranged behind the polymer film. The radiation used to read out information, that is to say in particular laser light, is thrown back at this reflective layer, so that the polymer film is illuminated twice in transmission when information is read out. The distance between the pits and the reflective layer (that is to say the thickness of the zone of the polymer film which adjoins the reflective layer and in which the refractive index is not changed locally) is preferably set up such that disruptive interference and superimposition effects are avoided. The configuration of the holographic data storage medium with a reflective layer behind the polymer film has the advantage that the arrangement can be fitted to a mechanical carrier or else directly to an object provided with information, since the image representing the stored information does not have to be reconstructed behind the polymer film.

To the polymer film, there can be assigned an absorber dye, which is set up to at least partly absorb a write beam serving to input information and to give up the heat produced in the process at least partly locally to the polymer film. An absorber dye of this type permits local heating of the polymer film which is sufficient to change the refractive index at a relatively low intensity of the write beam. The absorber dye is preferably arranged in an absorber layer arranged on the polymer film. It can also be admixed to the material of the polymer film; mixed forms are likewise conceivable. The absorber layer preferably has a thin layer (for example a thickness of 1 µm to 5 µm) of an optically transparent polymer (for example of polymethyl methacrylate (PMMA) or, in the case of applications for higher temperature, of polymethylpentene, polyetheretherketone (PEEK) or polyetherimide), which serves as a matrix or binder for the molecules of the absorber dye. The absorption maximum of the absorber dye should coincide with the optical wavelength of the write beam used, in order to achieve efficient absorption. For an optical wavelength of 532 nm of a write beam produced by a laser, for example dyes from the Sudan red family (diazo dyes) or eosin scarlet are suitable. For the common laser diodes with an optical wavelength of 665 nm or 680 nm, green dyes, for example from the styryl family (which are common as laser dyes), are more suitable.

In a preferred refinement of the invention, the holographic data storage medium has an adhesive layer for sticking the data storage medium to an object. The adhesive layer makes it possible to stick the data storage medium quickly and without difficulty to a desired object, for example to use the data storage medium as a machine-readable label in which information about the object is stored. Particularly suitable as an adhesive layer is a self-adhesive layer or a layer with a pressure-sensitive adhesive, which, in the delivered state of the data storage medium, is preferably provided with a protective covering that can be pulled off (for example of a film or a silicone paper).

Apart from the previously mentioned layers, the data storage medium can also have additional layers, for example a protective layer of a transparent varnish or polymer which is arranged in front of the polymer film or the absorber layer, or a mechanical carrier which is located behind the reflective layer. An optional adhesive layer is preferably arranged behind the reflective layer or behind the mechanical carrier.

Information to be stored can be input into the holographic data storage medium by means of a method in which phase information contained in a hologram of a storing object is calculated as a two-dimensional arrangement and a write beam from a writing device, preferably a laser lithograph, is aimed at a storage layer and/or possibly the associated absorber layer of the data storage medium and is driven in accordance with the two-dimensional arrangement in such a way that the local optical path length in the polymer film set up as a storage layer is set by a local change in the refractive index in accordance with the phase information. Since the physical processes in the scattering of light at a storing object are known, a conventional set-up for producing a hologram (in which, for example, coherent light from a laser, which is scattered by an object (storing object) is brought into interference with a coherent reference beam and the interference pattern produced in the process is recorded as a hologram) is simulated with the aid of a computer program, and the interference pattern and the phase information contained therein are calculated as a two-dimensional arrangement (two-dimensional array). The resolution of a suitable laser lithogragh is typically about 50 000 dpi (dots per inch). The refractive index in the polymer film can therefore be changed locally in regions or pits of a size of about 0.5 µm to 1 µm. The write speed and other details depend, inter alia, on the parameters of the write laser (laser power, optical wavelength) and the exposure duration.

The phase information is therefore preferably input into the storage layer in the form of pits of predefined size. In this case, the phase information can be stored in a pit in binary encoded form. This means that, in the region of a given pit, the polymer film assumes only one of two possible values for the refractive index. These values preferably differ considerably, in order that intermediate values occurring in practice for the refractive index which lie close to one or the other value can be assigned unambiguously to one or the other value, in order to store the information reliably and unambiguously.

Alternatively, the phase information can be stored in continuously encoded form in a pit, the local optical path length in the pit being selected from a predefined value range. This means that, in a given pit, the refractive index of the polymer film can assume any desired value from a predefined value range. In this case, the information may therefore be stored "in grey stages", so that each pit is given the information content from more than one bit.

In a method of reading information out of a holographic data storage medium, light, preferably coherent light (for example from a laser) is aimed over a large area onto a storage layer of the data storage medium, and the storage layer of the data storage medium is illuminated in transmission, the light possibly being reflected at the reflective layer (if one such is present) behind the polymer film set up as a storage layer. As a reconstruction of the information contained in the illuminated region, a holographic image is registered at a distance from the data storage medium, for example by using a CCD sensor which is connected to a data processing device.

The term "large area" is to be understood to mean an area which is considerably larger than the area of a pit. In this sense, for example, an area of 1 mm$^2$ is a large area. For the scheme according to which information is stored in a holographic data storage medium according to the invention and read out, there are many different possibilities. It is conceivable to read out from the data storage medium in one operation, by the entire area of the polymer film set up as a storage layer being illuminated in one operation. In particular in the case of larger areas, however, it is advantageous to divide up the information to be stored into a number or large number of individual regions (for example with a respective area of 1 mm$^2$) and to read out the information only from a predefined individual area in one operation.

When information is read out, the illuminated region of the polymer film acts as a diffraction grating, the incident light being deflected in a defined manner as a result of the locally varying refractive index or optical path length. The deflected light forms a holographic image of the stored object. This image represents the reconstruction of the information encoded via the varying local optical path length (refractive index modulation).

The holographic data storage medium can be used for different types of stored objects. For example, both the information contained in images, such as photographs, logos, texts, and so on, and machine-readable data can be stored and read out. The latter is carried out, for example, in the form of data pages, as they are known, the phase information contained in a hologram of a graphic bit pattern (which represents the data information) being input into the polymer film as explained. When the said data is read out, a holographic image of this graphic bit pattern is produced. The information contained therein can be registered, for example with the aid of an accurately adjusted CCD sensor, and processed by associated evaluation software. For the reproduction of images, in which high accuracy is not an issue, in principle even a simple matt disc, or, for example, a camera with an LCD screen is sufficient.

In the case of the holographic storage of machine-readable data, it is advantageous that the information does not have to be read out sequentially but that an entire data set can be registered in one operation, as explained. Should the surface of the storage layer be damaged, then, as opposed to a conventional data storage medium, this does not lead to a loss of data but only to a worsening of the resolution of the holographic image reconstructed when the information is read out, which is generally not a problem.

BRIEF DESCRIPTION OF THE DRAWINGS

In the following text, the invention will be explained further using exemplary embodiments. In the drawings

DESCRIPTION OF EXAMPLE EMBODIMENTS

Figure 1:
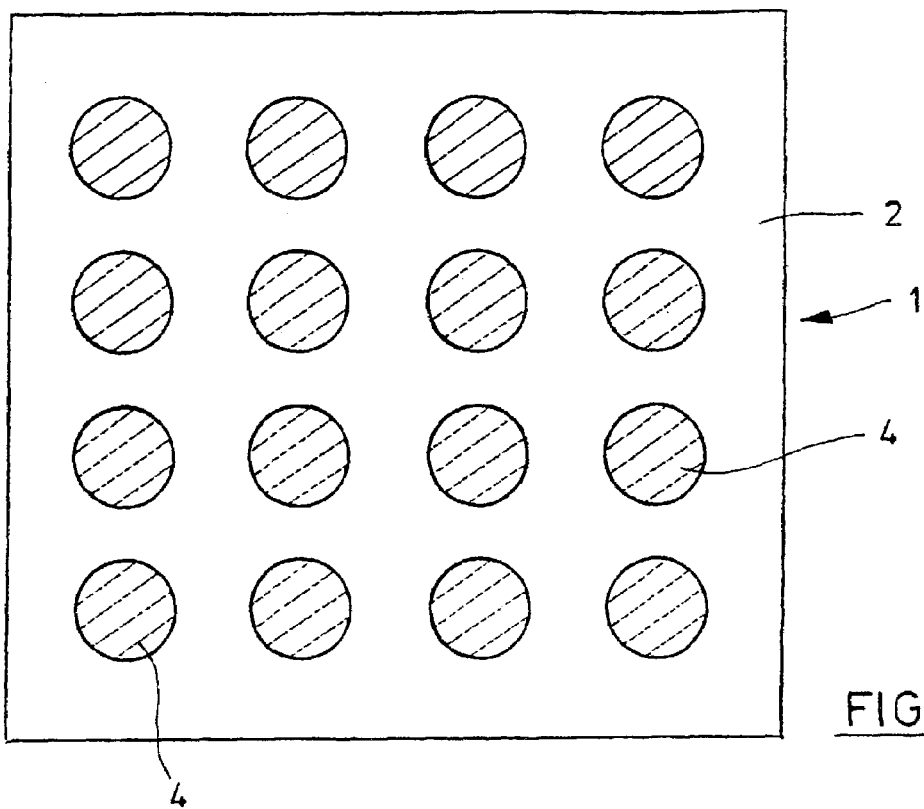
FIG. 1 shows a schematic plan view of a detail from a holographic data storage medium according to the invention.

FIG. 1 is a schematic plan view of one embodiment of a holographic data storage medium 1 into which information is put. The data storage medium 1 has a polymer film set up as a storage layer 2 which, in the exemplary embodiment, consists of biaxially oriented polypropylene (BOPP) and has a thickness of 35 µm. The refractive index of bipolarly oriented polypropylene may be changed locally by heating, which can be used to store information, as explained further above. The storage layer 2 preferably has a thickness in the range between 10 µm and 100 µm, but other thicknesses are likewise possible. Examples of further advantageous materials for the polymer film of the storage layer 2 are listed further above.

In the data storage medium 1, information is stored in the form of pits 4. In the region of a pit 4, the storage layer 2 has a different refractive index from that in the zones between the pits 4; the term "pit" is therefore to be understood more generally than in its original meaning ("hole"). In this case, the information can be stored in a pit in binary encoded form, by the refractive index assuming only two different values (it being possible for one of the two values also to coincide with the refractive index in the storage layer 2 in the zones between the pits 4). It is also possible to store the information in a pit 4 in continuously encoded form, it being possible for the refractive index within the pit 4 to assume any desired selected value from a predefined value range. Expressed in an illustrative way, in the case of storage in binary encoded form, a pit is "black" or "white", while in the case of storage in continuously encoded form, it can also assume all the grey values lying between.

In the exemplary embodiment, a pit 4 has a diameter of about 0.8 µm. Forms other than circular pits 4 are likewise possible, for example square or rectangular pits, but also other sizes. The typical dimension of a pit is preferably about 0.5 µm to 1.0 µm. FIG. 1 is therefore a highly enlarged illustration and merely shows a detail from the data storage medium 1.

Figure 2:
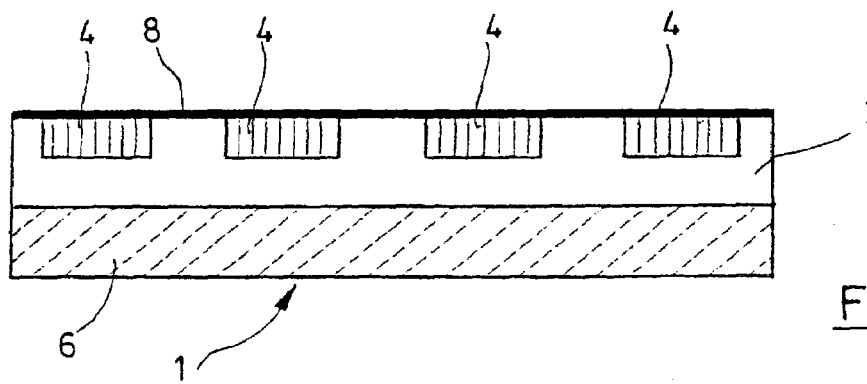
FIG. 2 shows a longitudinal section through the holographic data storage medium from FIG. 1

FIG. 2 illustrates a detail from the data storage medium 1 in a schematic longitudinal section, specifically not to scale. It can be seen that a pit 4 does not extend over the complete thickness of the storage layer 2. In practice, owing to the writing method for inputting information, in which the storage layer 2 is heated in the region of a pit 4, the transition zone in the lower region of a pit 4 to the lower region of the storage layer 2 is continuous, that is to say the refractive index changes gradually in this zone and is not delimited as sharply as shown in FIG. 2.

Under (that is to say behind) the storage layer 2 there is a reflective layer 6 which, in the exemplary embodiment, consists of aluminium. The reflective layer 6 can fulfil its function even if it is substantially thinner than the storage layer 2.

Applied to the upper side of the storage layer 2 is an absorber layer 8. In the exemplary embodiment, the absorber layer 8 has the absorber dye eosin scarlet, whose molecules are embedded in a matrix of an optically transparent polymer, specifically polymethyl methacrylate (PMMA). In the exemplary embodiment, the absorber layer 8 has a thickness of 1 µm. Eosin scarlet absorbs light particularly well in the wavelength range around 532 nm; this wavelength is particularly suitable for a write beam from a laser lithograph for inputting information into the data storage medium 1. Examples of other materials of the absorber layer 8 are indicated further above. For example, green dyes, for example from the styryl family are particularly suitable for optical wavelengths of 665 nm or 680 nm, at which the laser diodes of current DVD appliances operate; such laser diodes can be modulated directly, which makes the pulse generation substantially simpler and cheaper.

The absorber layer 8 has a preferred optical density in the range from 0.2 to 1.0; however other values are likewise conceivable. The optical density is a measure of the absorption, here based on the optical wavelength of a write beam. The optical density is defined as the negative decimal logarithm of the transmission through the absorber layer, which coincides with the product of the extinction coefficient at the wavelength of the write beam used, the concentration of the absorber dye in the absorber layer 8 and the thickness of the absorber layer 8.

The absorber layer 8 makes it easier to put information into the data storage medium 1. This is because when a write beam is focused onto the region of a pit 4, it is at least partly absorbed in the absorber layer 8. The heat liberated in the process is largely transferred to the storage layer 2 and in this way effects a local change in the refractive index in the storage layer 2 in the region of the pit 4. However, it is possible to dispense entirely with the absorber dye if very short laser pulses are used.

In order to put information into the data storage medium 1, first of all phase information contained in a hologram of a stored object is calculated as a two-dimensional arrangement. This can be carried out as a simulation of a classical structure for producing a photographically recorded hologram, in which coherent light from a laser, after being scattered at the stored object, is brought into interference with a coherent reference beam, and the interference pattern produced in the process is recorded as a hologram. The two-dimensional arrangement (two-dimensional array) then contains the information which is required to drive the write beam of a laser lithograph. In the exemplary embodiment, the laser lithograph has a resolution of about 50 000 dpi (that is to say about 0.5 μm). The write beam of the laser lithograph is guided in pulsed operation (typical pulse duration of about 1 μs to 10 μs with irradiated power of about 1 mW to 10 mW in order to input a pit 4) over the upper side of the data storage medium 1, in order to put the desired information sequentially into the data storage medium 1 (or into a preselected region of the data storage medium 1). In the process, the write beam heats the absorber layer 8 in accordance with the two-dimensional array and in this way produces the pits 4 as explained above.

Figure 3:
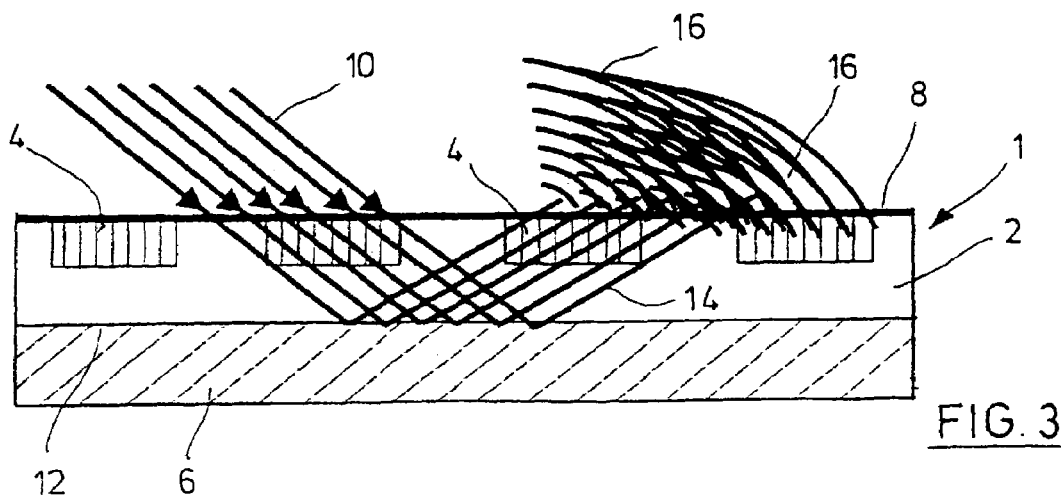
FIG. 3 shows a longitudinal section through the holographic data storage medium from FIG. 1, the processes during the reading of information being illustrated in a schematic way.

FIG. 3 illustrates in a schematic way how the information stored in the data storage medium 1 can be read out. For this purpose, coherent light from a laser (preferably of a wavelength which is only slightly absorbed by the absorber layer 8) is aimed at the upper side of the data storage medium 1. For reasons of clarity, only a small detail of this preferably parallel incident coherent light is illustrated in FIG. 3 and is designated by 10 (incident read beam). In practice, the coherent light is aimed at the storage layer 2 over a large area and covers a region of, for example, 1 mm$^2$. This is because the light originating from many pits 4 must be registered in order to reconstruct the stored information. The intensity of the incident read beam 10 is too weak to change the refractive index in the storage layer 2 and therefore the stored information.

The incident read beam 10 which, for practical reasons, strikes the surface of the data storage medium 1 at an angle, is reflected at the interface 12 between the storage layer 2 and the reflective layer 6, so that a reflected read beam 14 emerges from the interface 12 and, in the process, passes through the pits 4. Since the local refractive index of the storage layer 2 is different, depending on the pit 4, the local optical path length within the reflected read beam 14 varies, so that phase shifts occur. The result of this is that spherical waves 16 emerge from the data storage medium 1 in the manner of a diffraction grating, containing the stored phase information. At some distance from the data storage medium 1, a holographic image can be registered by a detector, having been caused by interference between the spherical waves 16.

The expenditure required for the detector and the further processing of the registered holographic image depend on the type of stored object, as already explained further above. For the reproduction of machine-readable data (data pages), a CCD sensor connected to a data processing device is particularly suitable, while for pure image reproduction, a simpler detector is practical, in particular if the image data are not to be processed further.

Apart from the layers which can be seen in FIG. 2, the data storage medium 1 can additionally have layers, for example a transparent protective layer above the absorber layer 8, and a carrier layer underneath the reflective layer 6. In preferred embodiments, an adhesive layer is arranged underneath this carrier layer or else directly underneath the reflective layer 6. With the aid of this adhesive layer, the data storage medium 1 can be stuck directly to an object. In this way, the data storage medium 1 can be used as a type of label which contains virtually invisible information which may be decoded only with the aid of a holographic construction for reading information.

If, for example, an absorber dye that is invisible in visible light (for example which absorbs in the infrared) or else no absorber dye is used, or if an absorber layer is washed away after information has been put into the data storage medium, the data storage medium may be configured to be largely transparent and very inconspicuous. A data storage medium of this type does not lead to any optical detriment of an object on which it is used as a label.

What is claimed is:

1. A holographic data storage medium, comprising a biaxially oriented polymer film set up as a storage layer for holographically readable holographic data, whose refractive index can be changed locally by heating and which is set up for storage of the holographic data as optical phase information via changes in a local optical path length in the polymer film, wherein when the holographic data is read out, light travels inside the polymer film.

2. The holographic data storage medium according to claim 1, wherein the polymer film comprises a material which is selected from the following group: polypropylene, polyester, polyvinyl chloride, polyethylene naphthalate, polyethylene terephthalate, polymethylpentene, polyimide.

3. The holographic data storage medium according to claim 1, wherein a reflective layer is arranged behind the polymer film.

4. The holographic data storage medium according to claim 1, wherein an absorber dye is assigned to the polymer film, which absorber dye is set up to at least partly absorb a write beam serving to input the holographic data and to deliver the heat produced in the process at least partly locally to the polymer film.

5. The holographic data storage medium according to claim 4, wherein the absorber dye is admixed with the material of the polymer film.

6. The holographic data storage medium according to claim 4, wherein the absorber dye is arranged in an absorber layer arranged on the polymer film.

7. The holographic data storage medium according to claim 6, wherein the absorber layer has a binder.

8. The holographic data storage medium according to claim 1, further comprising an adhesive layer for sticking the data storage medium to an object.

9. The holographic data storage medium according to claim 1, characterized in that holographic data is stored therein.

10. A method of putting information into a holographic data storage medium according to claim 1, wherein the phase information is calculated as a two-dimensional array and a write beam of a writing device is aimed at one or both of the storage layer and an associated absorber layer of the data storage medium and is driven in accordance with the two-dimensional array in such a way that the local optical path length in the polymer film is set by a local change in the refractive index in accordance with the phase information.

11. The method according to claim 10, wherein the phase information is input into the storage layer in the form of pits of predefined size.

12. The method according to claim 11, wherein the phase information is stored in a pit in binary encoded form.

13. The method according to claim 11, wherein the phase information is stored in a pit in continuously encoded form, the local optical path length in the pit being selected from a predefined value range.

14. A method of reading information out of a holographic data storage medium according to claim 1, wherein light is aimed over a large area onto the storage layer of the data storage medium, light travels in the storage layer of the data storage medium, and a holographic image is detected at a distance from the data storage medium as a reconstruction of the holographic data contained in the illuminated region.

15. The method according to claim 14, wherein the holographic image is detected by a CCD sensor connected to a data processing device.

16. The method according to claim 10, wherein the writing device comprises a laser.

17. The method according to claim 14, wherein the light aimed over a large area is coherent light.

18. The method according to claim 14, wherein the light is reflected at a reflective layer behind the polymer film.

19. A method of using a data storage medium, which has a biaxially oriented polymer film set up as a storage layer whose refractive index can be changed locally by heating, as a holographic data storage medium, the method comprising storing holographically readable holographic data as optical phase information in the polymer film via a change in a local optical path length and reading out the holographic data by illuminating the polymer film so that light travels inside the polymer film.

20. The method according to claim 19, wherein the data storage medium has the features of the holographic data storage medium.

21. A holographic data storage medium comprising a biaxially oriented polymer film which stores holographically readable holographic data as optical phase information via local changes in optical path length generated by selectively applying a write beam thereto, wherein the path length of a read beam in the polymer film for reading the stored holographic data varies based on the presence/absence of the local changes to thereby produce phase shifts in the read beam as the read beam travels inside the polymer film.

22. The holographic data storage medium according to claim 21, further comprising a reflecting layer attached to the polymer film for reflecting the read beam.

23. The holographic data storage medium according to claim 21, further comprising an absorber dye that at least partly absorbs the write beam and thereby locally heats the polymer film to provide the changes in optical path length.

24. The holographic data storage medium according to claim 23, wherein the absorber dye is admixed with a material of the polymer film.

25. The holographic data storage medium according to claim 23, wherein the absorber dye is provided in an absorber layer attached to the polymer film.

26. The holographic data storage medium according to claim 21, wherein the read beam is directed over an area of the polymer film that is large relative to the area of one of the local changes in optical path length.

27. The holographic data storage medium according to claim 21, further comprising an adhesive layer for adhering the holographic data storage medium to an object.

28. The holographic data storage medium according to claim 21, for storing machine-readable information.

29. The holographic data storage medium according to claim 21, wherein the optical phase information comprises binary encoded information.

30. The holographic data storage medium according to claim 21, wherein the optical phase information comprises continuously-encoded information.

31. The holographic data storage medium according to claim 21, wherein the optical phase information is stored in a two-dimensional array on the holographic data storage medium.

32. The holographic data storage medium according to claim 21, wherein the optical phase information is derived from a computer simulation.

* * * * *